United States Patent
Lazalier et al.

(10) Patent No.: US 12,018,827 B2
(45) Date of Patent: *Jun. 25, 2024

(54) LUMINAIRE

(71) Applicant: Hubbell Incorporated, Shelton, CT (US)

(72) Inventors: Ray Lazalier, Lake St. Louis, MO (US); Sean Rogers, Saint Louis, MO (US)

(73) Assignee: Hubbell Incorporated, Shelton, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/057,618

(22) Filed: Nov. 21, 2022

(65) Prior Publication Data

US 2023/0080092 A1 Mar. 16, 2023

Related U.S. Application Data

(63) Continuation of application No. 17/161,047, filed on Jan. 28, 2021, now Pat. No. 11,525,564.

(60) Provisional application No. 62/968,677, filed on Jan. 31, 2020.

(51) Int. Cl.
| | |
|---|---|
| *F21V 23/06* | (2006.01) |
| *F21S 8/02* | (2006.01) |
| *H02G 3/20* | (2006.01) |
| *F21Y 115/10* | (2016.01) |

(52) U.S. Cl.
CPC .............. *F21V 23/06* (2013.01); *F21S 8/026* (2013.01); *H02G 3/20* (2013.01); *F21Y 2115/10* (2016.08)

(58) Field of Classification Search
CPC ........ F21V 23/06; F21V 21/02; F21V 29/507; F21V 29/503; F21V 15/01; F21V 23/001; F21S 8/026; F21S 8/00; H02G 3/20; F21Y 2115/10
See application file for complete search history.

(56) References Cited

U.S. PATENT DOCUMENTS

| | | | |
|---|---|---|---|
| 7,448,772 B2 | 11/2008 | Hampton | |
| 9,557,022 B2 | 1/2017 | Araki | |
| 10,240,727 B2 * | 3/2019 | Athalye | .............. F21S 8/026 |
| 11,525,564 B2 * | 12/2022 | Lazalier | .............. F21S 8/00 |
| 2003/0139078 A1 | 7/2003 | Ruthenberg | |

(Continued)

OTHER PUBLICATIONS

PCT/US2021/015473 International Search Report and Written Opinion dated Apr. 23, 2021 (16 pages).

(Continued)

*Primary Examiner* — Bao Q Truong
(74) *Attorney, Agent, or Firm* — Robinson & Cole LLP

(57) ABSTRACT

A luminaire is configured to be removably coupled to a fixture, the fixture being removably coupled to a splice box, the luminaire including a housing including a first end and a second end, the first end including a coupling mechanism configured to couple to the fixture; a printed circuit board coupled adjacent the second end; at least one LED physically and electrically coupled to the printed circuit board; a lens couple to the housing over the printed circuit board; an adapter in electrical communication with the printed circuit board, the adapter configured to electrically and physically couple to a socket of the fixture.

20 Claims, 4 Drawing Sheets

(56) References Cited

U.S. PATENT DOCUMENTS

2008/0130298 A1* 6/2008 Negley ............... F21V 29/75
362/365
2012/0324772 A1 12/2012 Gingerella
2016/0377280 A1 12/2016 Acampora et al.
2018/0017243 A1 1/2018 Palmer
2019/0067890 A1 2/2019 Nguyen et al.

OTHER PUBLICATIONS

Hubbell, VSL Series Killark Lighting, Features and Specifications (5 pages).
Hubbell, WTR LED Retrofit for Standard Location Environments, Product Brochure, copyright 2019 (6 pages).
Energyficient, Q-Lux LED Retrofit Utility Fixture, Product Specification (1 page).
Canadian Patent Application No. 197342 Office Action dated Jan. 5, 2022.

* cited by examiner

LUMINAIRE

CROSS-REFERENCE TO RELATED APPLICATIONS

This application claims the benefit of U.S. application Ser. No. 17/161,047, filed on Jan. 28, 2021, and U.S. Provisional Patent Application No. 62/968,677, filed Jan. 31, 2020, the entire contents of each is incorporated by reference.

BACKGROUND

The application relates to a luminaire for use with a splice box and a fixture that is useable with the splice box.

SUMMARY

In one embodiment, a luminaire is configured to be removably coupled to a fixture, the fixture being removably coupled to a splice box, the luminaire including a housing including a first end and a second end, the first end including a coupling mechanism configured to couple to the fixture; a printed circuit board coupled adjacent the second end; at least one LED physically and electrically coupled to the printed circuit board; a lens couple to the housing over the printed circuit board; an adapter in electrical communication with the printed circuit board, the adapter configured to electrically and physically couple to a socket of the fixture.

In another embodiment, a method of assembling a light fixture. The method including electrically and physically coupling an adapter of a luminaire to a socket of the fixture, and physically coupling a housing of the luminaire to the fixture.

In another embodiment, a luminaire is configured to be removably coupled to a fixture. The fixture is removably coupled to a splice box and having a socket. The luminaire includes a housing operable as a heat sink and including a first end and a second end. The first end includes a coupling mechanism configured to couple to the fixture, a printed circuit board coupled to the housing adjacent the second end, at least one LED physically and electrically coupled to the printed circuit board, and an adapter in electrical communication with the printed circuit board. The adapter is configured to electrically and physically couple to the socket of the fixture.

In another embodiment, a luminaire is configured to be removably coupled to a fixture. The fixture is removably coupled to a splice box and having a socket. The luminaire includes a unitary housing including a first end and a second end. The first end of the housing including a coupling mechanism configured to couple to the fixture. The luminaire further includes a printed circuit board coupled to a wall of the housing, and the wall is positioned adjacent the second end. At least one LED is physically and electrically coupled to the printed circuit board, and an adapter in electrical communication with the printed circuit board. The adapter is configured to electrically and physically couple to a socket of the fixture.

Other aspects of the invention will become apparent by consideration of the detailed description and accompanying drawings.

DETAILED DESCRIPTION

Figure 1:
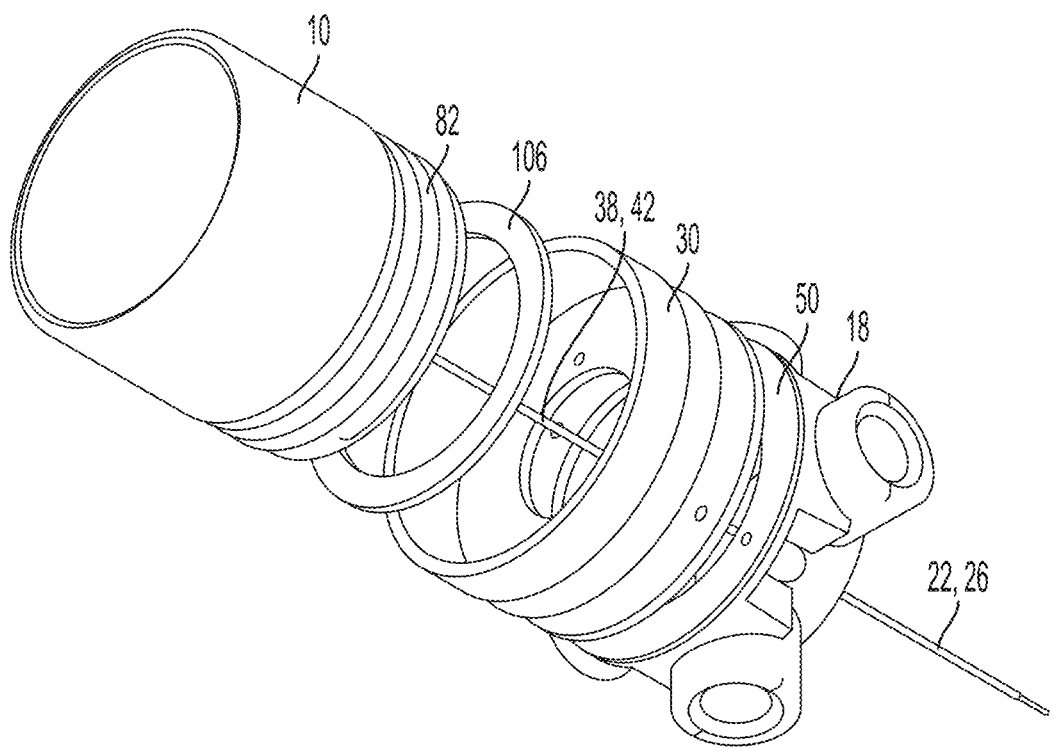
FIG. 1 illustrates an exploded view of a fixture and a luminaire according to one embodiment.
Figure 2:
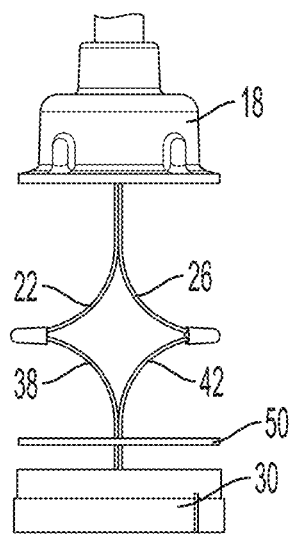
FIG. 2 is another exploded view of the fixture of FIG. 1.
Figure 3:
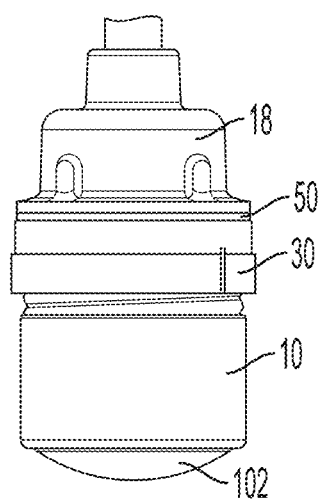
FIG. 3 is a side view of the fixture and the luminaire of FIG. 1.
Figure 4:
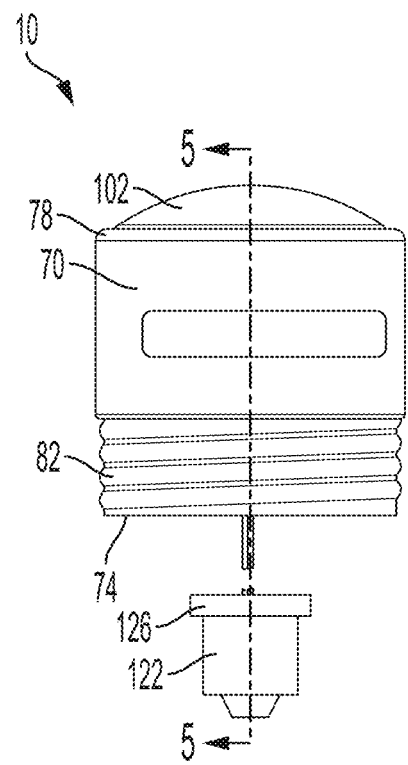
FIG. 4 is a side view of the luminaire of FIG. 1.
Figure 5:
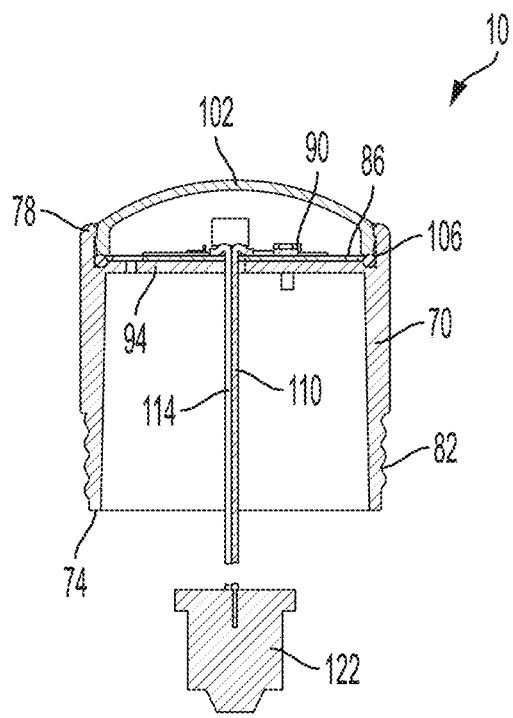
FIG. 5 is a cross-sectional view of the luminaire of FIG. 1 along a longitudinal axis thereof.
Figure 6:
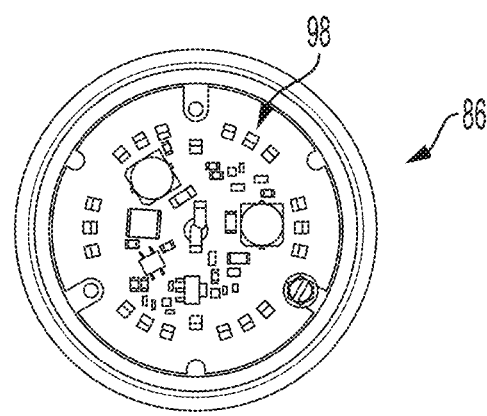
FIG. 6 is a plan view of a portion of the luminaire of FIG. 1.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

FIGS. 1-11 illustrate a light emitting diode (LED) luminaire 10 that is removably coupleable to a fixture 14. The fixture 14 is designed for installations where moisture, dirt, dust, corrosion and vibration may be present.

The fixture 14 includes a splice box or mount 18 that is configured to be coupled to a support surface in hallways, closets, elevator pits, docks, stairwells, access tunnels, and mechanical rooms etc. Power is supplied to the splice box 18 by a hot line wire 22 and a neutral line wire 26 that extend therethrough. A fixture 30 is electrically and physically coupled to the splice box 18. In particular, the fixture 30 includes housing 34 that couples to the splice box 18 and a hot wire 38 and a neutral line wire 42 that are physically and electrically coupled the respective hot line and neutral line wires 22, 26 of the splice box 18. In the illustrated embodiment, the fixture is formed of aluminum, although other suitable materials may be used. The fixture 30 includes a socket 46 (FIG. 8) that is configured to be in electrical communication with the power supply via the wires 38, 42. In the illustrated embodiment, the socket 46 is an Edison socket. A gasket or sealing member 50 is positioned between the splice box 18 and the fixture 30. The fixture 30 includes a coupling mechanism. In the illustrated embodiment, the coupling mechanism is a plurality of threads (not shown) defined on an internal surface of the fixture 30. In other embodiments, the fixture 30 may include alternative coupling mechanisms (e.g., by a snap fit connection) defined on the internal surface or an external surface thereof. A guard (not shown) may be physically coupled to the fixture 30.

As shown in FIGS. 3-12, the luminaire 10 includes a unitary (e.g., one-piece, integrally-formed, etc.) housing 70 that has a longitudinal axis A, a first end 74, and a second end 78 opposite the first end 74. In the illustrated embodiment, the housing 70 is constructed from aluminum, which is useful or operable for heat sinking and corrosion resistance. In other or additional embodiments, the housing 70 may be formed from other or additional suitable materials. The housing 70 includes a coupling mechanism 82 at or adjacent the first end 74. In the illustrated embodiment, the coupling mechanism 82 is a plurality of threads defined on an external surface of the housing 70 at or adjacent the first end 74. In other embodiments, the housing 70 may include alternative coupling mechanisms (e.g., by a snap fit connection) defined on the external surface or an internal surface thereof. The coupling mechanism 82 of the housing 70 is configured to engage the coupling mechanism of the fixture 30, as will be discussed in greater detail below. A printed circuit board 86 (PCB) is supported by the housing 70 adjacent to the second end 78. In the illustrated embodiment, the PCB 86 is coupled (e.g., by one or more fasteners 90, FIGS. 5 and 10) to a wall 94 that is recessed relative to the second end 78. One or more LEDs 98 are physically and electrically coupled to the PCB 86. A lens 102 is coupled (e.g., by a snap fit connection) to the second end 78 over the PCB 86. In the illustrated embodiment, the lens is polycarbonate although other suitable materials may be used. Light from the one or more LEDs 98 projects outwardly from the PCB 86, and therefore the housing 70, through the lens 102. A gasket or sealing member 106 is coupled between the housing 70 and the lens 102 and creates a seal therebetween.

Further with respect to FIGS. 4-12, a hot line wire 110 and a neutral line wire 114 extend between the PCB 86 and an adapter 122 that is spaced apart from the housing 70. The adapter 122 has a flange 126. Each of the wires 110, 114 has a first end that is physically and electrically coupled to the PCB 86 and a second end that is physically and electrically coupled to the adapter 122. The hot line wire 110 and the neutral line wire 114 extend through an aperture 118 in the wall 94 of the housing 70. The adapter 122 is configured to physically and electrically attach to the socket 46 of the fixture 30. In the illustrated embodiment, the adapter 122 is configured to threadably couple to the socket 46, but in other embodiments, the adapter 122 may be coupled to the socket 46 in other ways. The PCB 86 allows electrical communication between a power supply (not shown) and the one or more LEDs 98 via the adapter 122. Accordingly, the PCB 86 illuminates the one or more LEDs 98 via power supplied through the adapter 122.

Figure 7:
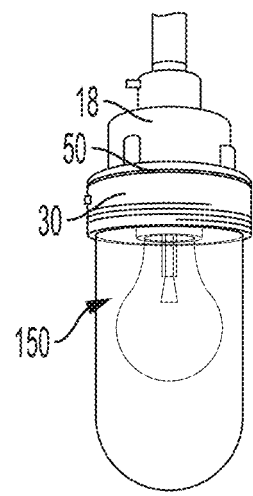
FIG. 7 is a side view of the fixture of FIG. 1 with a conventional LED assembly.
Figure 8:
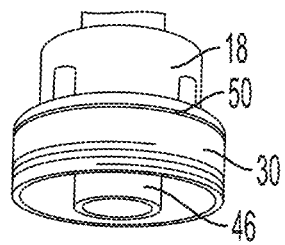
FIG. 8 is another exploded view of the fixture and the luminaire of FIG. 1.
Figure 8:
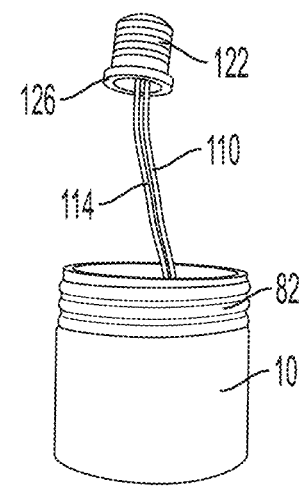
Figure 9:
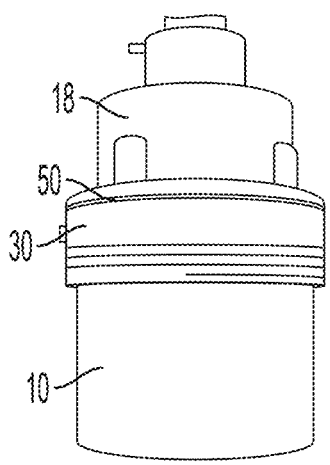
FIG. 9 is a side view of the fixture and the luminaire of FIG. 1.

The adapter 122 is configured to physically and electrically couple to the socket 46 of the fixture 30 and the first end 74 of the luminaire housing 70 is configured to be coupled to the fixture 30 of the splice box 18. The housing 70 is watertight and vaportight when coupled to the fixture 30. When used, the guard couples to the fixture 30 over the luminaire 10. The luminaire 10 can easily and quickly replace existing and conventional lamp and globe assemblies 150 (FIG. 7).

In the embodiment illustrated in FIGS. 1-9, the luminaire housing 70 has a height of approximately 3.04 inches and a maximum diameter of about 3.34 inches. Approximately as used herein means plus or minus 0.05 inches. Also, the luminaire 10 of FIG. 1-9 may accommodate a voltage of 120V, may accommodate 9 W, and may output 1085 lumen. The luminaire 10 may take 99,000 hours to degrade to 70% of the original output.

Figure 10:
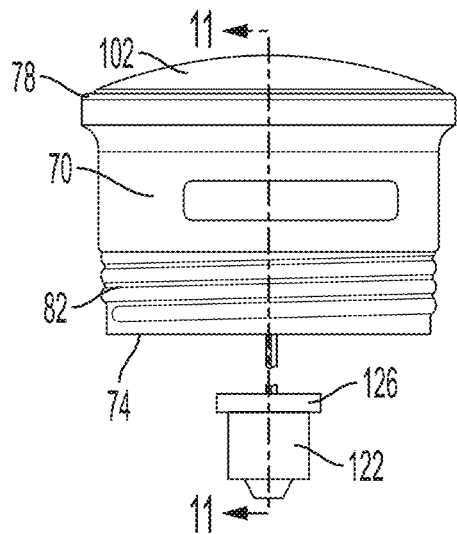
FIG. 10 is a side view of a luminaire according to another embodiment.
Figure 11:
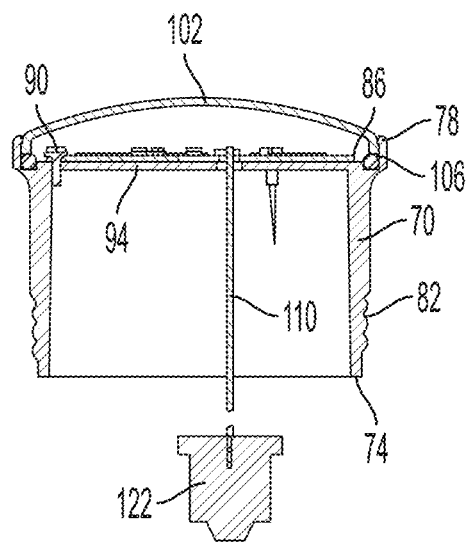
FIG. 11 is a cross-section view of the luminaire of FIG. 10 along a longitudinal axis thereof.
Figure 12:
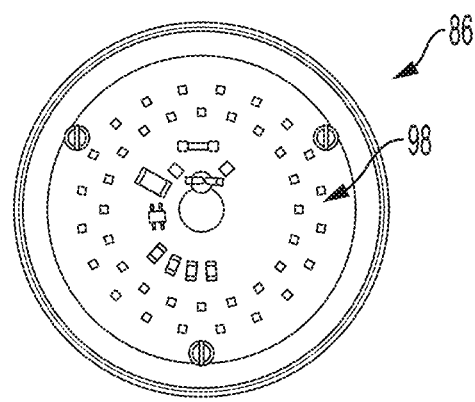
FIG. 12 is a plan view of a printed circuit board of the luminaire of FIG. 10.

In the embodiment illustrated in FIGS. 10-12, the luminaire housing 70 has a height of approximately 3.10 inches and a maximum diameter of about 4.80 inches. Approximately as used herein means plus or minus 0.05 inches. Also, the luminaire 10 of FIG. 10-12 may accommodate a voltage of 120V, may accommodate 18 W, and may output 2100 lumen. The luminaire 10 may take 99,000 hours to degrade to 70% of the original output.

In other or additional embodiments, the luminaire may have different sizes and shapes than those disclosed herein. That is, in other or alternative embodiments, the luminaire may have different heights and diameters. Also, the housing of the luminaire may have other shapes than cylindrical, such as cuboidal or polygonal. Accordingly, the luminaire may have different dimensions (e.g., widths, cross-sectional areas, etc.) in other or additional embodiments.

To assemble to the fixture 30 to slice box 18, the gasket 50 is placed between the fixture 30 and the splice box 18, the respective hot line wires 22, 38 and the neutral line wires 26, 42 of the fixture 30 and splice box 18 are physically and electrically coupled, and the fixture 30 is coupled (e.g. by fasteners, not shown) to the splice box 18.

To assemble the luminaire 10 to the fixture 30, the adapter 122 is coupled (e.g., threaded) into the socket 46 of the fixture 30 and the luminaire housing 70 is coupled (e.g., threaded) to the housing 34 of the fixture 30. The guard, when used, can then be coupled to the housing 34 of the fixture 30 over the luminaire 10.

Various features and advantages of the invention are set forth in the following claims.

What is claimed is:

1. A luminaire assembly configured to be removably coupled to a fixture, the fixture being removably coupled to a splice box and having a socket, the luminaire assembly comprising:
   a housing configured to extend outwardly from the fixture, the housing including a first end with a plurality of threads configured to couple with a plurality of threads of the fixture and a second end opposite the first end;
   a printed circuit board supported by the housing and positioned between the first end and the second end;
   an LED physically and electrically coupled to the printed circuit board; and
   an adapter assembly configured to allow communication between the printed circuit board and the fixture, the adapter assembly including an adapter configured to physically and electrically couple to a socket of the fixture.

2. The luminaire assembly of claim 1, wherein a lens is coupled to the housing over the printed circuit board.

3. The luminaire assembly of claim 2, wherein the lens is sealed with respect to the housing.

4. The luminaire assembly of claim 2, wherein a gasket is positioned between the housing and the lens to seal the lens with respect to the housing.

5. The luminaire assembly of claim 1, wherein the housing is watertight and vaportight when coupled to the fixture.

6. The luminaire assembly of claim 1, wherein the adapter assembly further comprises a hot line wire and a neutral line wire, each of the hot line wire and the neutral line wire coupled to and extending from the adapter and configured to electrically couple to the printed circuit board.

7. The luminaire assembly of claim 1, further comprising a hot line wire and a neutral line wire coupled to and extending from the printed circuit board through an aperture in the housing towards the first end of the housing, each of the hot line wire and the neutral line wire configured to allow communication between the printed circuit board and the fixture.

8. The luminaire assembly of claim 1, wherein the housing is formed from a metal material.

9. The luminaire assembly of claim 1, wherein the housing is formed from aluminum.

10. A luminaire assembly configured to be removably coupled to a fixture, the fixture being removably coupled to a splice box, the luminaire comprising:

a housing configured to extend outwardly from the fixture, the housing including a first end that is configured to couple to the fixture and a second end opposite the first end;

a printed circuit board supported by the housing and positioned between the first end and the second end;

an LED physically and electrically coupled to the printed circuit board; and an adapter assembly in electrical communication between the printed circuit board and fixture, the adapter assembly including an adapter configured to threadably and electrically couple to a socket of the fixture.

11. The luminaire assembly of claim 10, wherein a lens is coupled to the housing over the printed circuit board.

12. The luminaire assembly of claim 11, wherein the lens is sealed with respect to the housing.

13. The luminaire assembly of claim 11, wherein a gasket is positioned between the housing and the lens to seal the lens with respect to the housing.

14. The luminaire assembly of claim 10, wherein the housing is watertight and vaportight when coupled to the fixture.

15. The luminaire assembly of claim 10, wherein the adapter assembly further comprises a hot line wire and a neutral line wire, each of the hot line wire and the neutral line wire extending from the adapter and configured to electrically couple to the printed circuit board.

16. The luminaire assembly of claim 10, further comprising a hot line wire and a neutral line wire extending from the printed circuit board through an aperture in the housing towards the first end of the housing, each of the hot line wire and the neutral line wire configured to allow communication between the printed circuit board and the fixture.

17. A luminaire assembly configured to be removably coupled to a fixture, the fixture being removably coupled to a splice box, the luminaire comprising:

a housing configured to extend outwardly from the fixture, the housing including a first end that is configured to couple to the fixture and a second end opposite the first end;

a printed circuit board supported by the housing and positioned between the first end and the second end;

an LED physically and electrically coupled to the printed circuit board; and an adapter assembly configured to allow electrical communication between with the printed circuit board and the fixture, the adapter assembly including an adapter configured to physically couple to a socket of the fixture, an adapter hot line wire coupled to the adapter and configured to electrically couple to the printed circuit board, and an adapter neutral line wire coupled to the adapter and configured to electrically couple to the printed circuit board, wherein when the adapter is physically coupled to the socket, the adapter assembly allows electrical communication between the fixture and the printed circuit board to selectively power the LED.

18. The luminaire assembly of claim 17, wherein the first end that has a plurality of threads defined on an outer surface thereof that are configured to couple with a plurality of threads of the fixture.

19. The luminaire assembly of claim 17, wherein the housing is formed from a metal material.

20. The luminaire assembly of claim 17, further comprising a hot line wire and a neutral line wire extending from the printed circuit board through an aperture in the housing towards the first end of the housing, the hot line wire of the printed circuit board configured to communicate with the adapter hot line wire and the neutral line wire of the printed circuit board configured to communicate with the adapter neutral line wire.

* * * * *